(12) United States Patent
Tyler et al.

(10) Patent No.: US 11,130,285 B2
(45) Date of Patent: Sep. 28, 2021

(54) PRINT HEAD AND METHOD FOR PRINTING COMPOSITE STRUCTURE AND TEMPORARY SUPPORT

(71) Applicant: CC3D LLC, Coeur d'Alene, ID (US)

(72) Inventors: Kenneth Lyle Tyler, Coeur d'Alene, ID (US); Ryan C. Stockett, Lebanon, NH (US)

(73) Assignee: Continuous Composites Inc., Coeur d'Alene, ID (US)

( * ) Notice: Subject to any disclaimer, the term of this patent is extended or adjusted under 35 U.S.C. 154(b) by 608 days.

(21) Appl. No.: 15/992,282

(22) Filed: May 30, 2018

(65) Prior Publication Data

US 2019/0001566 A1  Jan. 3, 2019

Related U.S. Application Data

(60) Provisional application No. 62/526,448, filed on Jun. 29, 2017.

(51) Int. Cl.
*B29C 64/209* (2017.01)
*B29C 64/336* (2017.01)
(Continued)

(52) U.S. Cl.
CPC .......... *B29C 64/209* (2017.08); *B29C 64/124* (2017.08); *B29C 64/165* (2017.08);
(Continued)

(58) Field of Classification Search
CPC ......... B33Y 10/00; B33Y 30/00; B33Y 50/02; B33Y 70/00; B29C 64/209; B29C 64/255; B29C 64/40; B29C 64/112; B29K 2101/10
See application file for complete search history.

(56) References Cited

U.S. PATENT DOCUMENTS 3,286,305 A  11/1966 Seckel
3,809,514 A   5/1974 Nunez
(Continued)

FOREIGN PATENT DOCUMENTS

DE    4102257 A1   7/1992
EP    2589481 B1   1/2016
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

(Continued)

*Primary Examiner* — Jacob T Minskey
*Assistant Examiner* — Baileigh Kate Darnell
(74) *Attorney, Agent, or Firm* — Ryan C. Stockett (57) ABSTRACT

A print head is disclosed for use with an additive manufacturing system. The print head may include a nozzle tip, a first matrix source configured to selectively supply a structural matrix to the nozzle tip, and a second matrix source configured to selectively supply a temporary support matrix to the nozzle tip. The print head may also include a reinforcement supply configured to supply a continuous reinforcement through the nozzle tip only when the first matrix source is supplying the structural matrix to the nozzle tip.

17 Claims, 3 Drawing Sheets

(51) Int. Cl.

| | | |
|---|---|---|
| *B33Y 30/00* | (2015.01) | |
| *B29C 64/165* | (2017.01) | |
| *B29C 70/38* | (2006.01) | |
| *B29C 70/06* | (2006.01) | |
| *B29C 70/52* | (2006.01) | |
| *B33Y 10/00* | (2015.01) | |
| *B29C 70/50* | (2006.01) | |
| *B29C 70/24* | (2006.01) | |
| *B29C 64/218* | (2017.01) | |
| *B29C 70/16* | (2006.01) | |
| *B33Y 70/00* | (2020.01) | |
| *B29C 64/295* | (2017.01) | |
| *B29C 64/291* | (2017.01) | |
| *B33Y 50/02* | (2015.01) | |
| *B29C 64/393* | (2017.01) | |
| *B29C 64/124* | (2017.01) | |
| *B29C 64/255* | (2017.01) | |
| *B29C 64/40* | (2017.01) | |
| *B29K 105/00* | (2006.01) | |
| *B29K 105/08* | (2006.01) | |
| *B29C 35/08* | (2006.01) | |
| *B29C 35/02* | (2006.01) | |
| *F16L 9/128* | (2006.01) | |
| *B29C 48/15* | (2019.01) | |
| *B22F 12/00* | (2021.01) | |
| *B22F 10/10* | (2021.01) | |
| *B22F 10/00* | (2021.01) | |
| *B29C 64/245* | (2017.01) | |
| *B29C 64/112* | (2017.01) | |
| *B29K 101/10* | (2006.01) | |

(52) U.S. Cl.
CPC .......... *B29C 64/218* (2017.08); *B29C 64/255* (2017.08); *B29C 64/291* (2017.08); *B29C 64/295* (2017.08); *B29C 64/336* (2017.08); *B29C 64/393* (2017.08); *B29C 64/40* (2017.08); *B29C 70/06* (2013.01); *B29C 70/16* (2013.01); *B29C 70/24* (2013.01); *B29C 70/384* (2013.01); *B29C 70/50* (2013.01); *B29C 70/523* (2013.01); *B33Y 10/00* (2014.12); *B33Y 30/00* (2014.12); *B33Y 50/02* (2014.12); *B33Y 70/00* (2014.12); *B22F 10/00* (2021.01); *B22F 10/10* (2021.01); *B22F 12/00* (2021.01); *B29C 35/0261* (2013.01); *B29C 35/0805* (2013.01); *B29C 48/15* (2019.02); *B29C 64/112* (2017.08); *B29C 64/245* (2017.08); *B29C 2035/0827* (2013.01); *B29C 2035/0833* (2013.01); *B29C 2035/0838* (2013.01); *B29C 2035/0855* (2013.01); *B29C 2035/0877* (2013.01); *B29K 2101/10* (2013.01); *B29K 2105/08* (2013.01); *B29K 2105/251* (2013.01); *F16L 9/128* (2013.01)

(56) References Cited

U.S. PATENT DOCUMENTS

| | | | |
|---|---|---|---|
| 3,984,271 A | 10/1976 | Gilbu | |
| 3,993,726 A | 11/1976 | Moyer | |
| 4,643,940 A | 2/1987 | Shaw et al. | |
| 4,671,761 A | 6/1987 | Adrian et al. | |
| 4,822,548 A | 4/1989 | Hempel | |
| 4,851,065 A | 7/1989 | Curtz | |
| 5,002,712 A | 3/1991 | Goldmann et al. | |
| 5,037,691 A | 8/1991 | Medney et al. | |
| 5,296,335 A | 3/1994 | Thomas et al. | |
| 5,340,433 A | 8/1994 | Crump | |
| 5,569,349 A * | 10/1996 | Almquist | B29C 41/12 156/242 |
| 5,746,967 A | 5/1998 | Hoy et al. | |
| 5,866,058 A | 2/1999 | Batchelder et al. | |
| 5,936,861 A | 8/1999 | Jang et al. | |
| 6,153,034 A | 11/2000 | Lipsker | |
| 6,459,069 B1 | 10/2002 | Rabinovich | |
| 6,501,554 B1 | 12/2002 | Hackney et al. | |
| 6,799,081 B1 | 9/2004 | Hale et al. | |
| 6,803,003 B2 | 10/2004 | Rigali et al. | |
| 6,934,600 B2 | 8/2005 | Jang et al. | |
| 7,039,485 B2 | 5/2006 | Engelbart et al. | |
| 7,555,404 B2 | 6/2009 | Brennan et al. | |
| 7,795,349 B2 | 9/2010 | Bredt et al. | |
| 8,221,669 B2 | 7/2012 | Batchelder et al. | |
| 8,962,717 B2 | 2/2015 | Roth et al. | |
| 9,126,365 B1 | 9/2015 | Mark et al. | |
| 9,126,367 B1 | 9/2015 | Mark et al. | |
| 9,149,988 B2 | 10/2015 | Mark et al. | |
| 9,156,205 B2 | 10/2015 | Mark et al. | |
| 9,186,846 B1 | 11/2015 | Mark et al. | |
| 9,186,848 B2 | 11/2015 | Mark et al. | |
| 9,327,452 B2 | 5/2016 | Mark et al. | |
| 9,327,453 B2 | 5/2016 | Mark et al. | |
| 9,370,896 B2 | 6/2016 | Mark | |
| 9,381,702 B2 | 7/2016 | Hollander | |
| 9,457,521 B2 | 10/2016 | Johnston et al. | |
| 9,458,955 B2 | 10/2016 | Hammer et al. | |
| 9,527,248 B2 | 12/2016 | Hollander | |
| 9,539,762 B2 | 1/2017 | Durand et al. | |
| 9,579,851 B2 | 2/2017 | Mark et al. | |
| 9,688,028 B2 | 6/2017 | Mark et al. | |
| 9,694,544 B2 | 7/2017 | Mark et al. | |
| 9,764,378 B2 | 9/2017 | Peters et al. | |
| 9,770,876 B2 | 9/2017 | Farmer et al. | |
| 9,782,926 B2 | 10/2017 | Witzel et al. | |
| 2002/0009935 A1 | 1/2002 | Hsiao et al. | |
| 2002/0062909 A1 | 5/2002 | Jang et al. | |
| 2002/0113331 A1 | 8/2002 | Zhang et al. | |
| 2002/0165304 A1 | 11/2002 | Mulligan et al. | |
| 2003/0044539 A1 | 3/2003 | Oswald | |
| 2003/0056870 A1 | 3/2003 | Comb et al. | |
| 2003/0083771 A1 * | 5/2003 | Schmidt | B29C 64/112 700/119 |
| 2003/0160970 A1 | 8/2003 | Basu et al. | |
| 2003/0186042 A1 | 10/2003 | Dunlap et al. | |
| 2003/0236588 A1 | 12/2003 | Jang et al. | |
| 2005/0006803 A1 | 1/2005 | Owens | |
| 2005/0061422 A1 | 3/2005 | Martin | |
| 2005/0104257 A1 | 5/2005 | Gu et al. | |
| 2005/0109451 A1 | 5/2005 | Hauber et al. | |
| 2005/0230029 A1 | 10/2005 | Vaidyanathan et al. | |
| 2007/0003650 A1 | 1/2007 | Schroeder | |
| 2007/0228592 A1 | 10/2007 | Dunn et al. | |
| 2008/0176092 A1 | 7/2008 | Owens | |
| 2009/0095410 A1 | 4/2009 | Oldani | |
| 2011/0032301 A1 | 2/2011 | Fienup et al. | |
| 2011/0143108 A1 | 6/2011 | Fruth et al. | |
| 2012/0060468 A1 | 3/2012 | Dushku et al. | |
| 2012/0159785 A1 | 6/2012 | Pyles et al. | |
| 2012/0231225 A1 | 9/2012 | Mikulak et al. | |
| 2012/0247655 A1 | 10/2012 | Erb et al. | |
| 2013/0164498 A1 | 6/2013 | Langone et al. | |
| 2013/0209600 A1 | 8/2013 | Tow | |
| 2013/0233471 A1 | 9/2013 | Kappesser et al. | |
| 2013/0292039 A1 | 11/2013 | Peters et al. | |
| 2013/0337256 A1 | 12/2013 | Farmer et al. | |
| 2013/0337265 A1 | 12/2013 | Farmer | |
| 2014/0034214 A1 | 2/2014 | Boyer et al. | |
| 2014/0061974 A1 | 3/2014 | Tyler | |
| 2014/0159284 A1 | 6/2014 | Leavitt | |
| 2014/0232035 A1 | 8/2014 | Bheda | |
| 2014/0268604 A1 | 9/2014 | Wicker et al. | |
| 2014/0291886 A1 | 10/2014 | Mark et al. | |
| 2015/0136455 A1 | 5/2015 | Fleming | |
| 2016/0012935 A1 | 1/2016 | Rothfuss | |
| 2016/0031155 A1 | 2/2016 | Tyler | |
| 2016/0046082 A1 | 2/2016 | Fuerstenberg | |
| 2016/0052208 A1 | 2/2016 | Debora et al. | |

(56) References Cited

U.S. PATENT DOCUMENTS

| | | |
|---|---|---|
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346997 A1* | 12/2016 | Lewis ................. B29C 67/0055 |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kune et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2018/0361406 A1* | 12/2018 | Katon ....................... B05C 5/00 |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

(56) References Cited

OTHER PUBLICATIONS

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

* cited by examiner

PRINT HEAD AND METHOD FOR PRINTING COMPOSITE STRUCTURE AND TEMPORARY SUPPORT

RELATED APPLICATIONS

This application is based on and claims the benefit of priority from United States Provisional Application Nos. 62/526,448 that was filed on Jun. 29, 2017, the contents of which are expressly incorporated herein by reference.

TECHNICAL FIELD

The present disclosure relates generally to additive manufacturing and, more particularly, to a method for printing a continuous-fiber composite structure and a fiberless temporary support with the same print head.

BACKGROUND

Continuous fiber 3D printing (a.k.a., CF3D™) involves the use of continuous fibers embedded within a matrix discharging from a moveable print head. The matrix can be a traditional thermoplastic, a powdered metal, a liquid resin (e.g., a UV curable and/or two-part resin), or a combination of any of these and other known matrixes. Upon exiting the print head, a cure enhancer (e.g., a UV light, an ultrasonic emitter, a heat source, a heat sink, a catalyst supply, etc.) is activated to initiate and/or complete curing of the matrix. This curing occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

Although CF3D™ provides for increased strength and free-space fabrication, there may be situations where in situ-fabricated temporary supports are beneficial. For example, some fabrications of larger mass may need initial support to limit deformation. In another example, a temporary support may provide backing that buoys up the composite structure during compaction. The disclosed print head and method are directed to addressing these issues and/or other problems of the prior art.

SUMMARY

In one aspect, the present disclosure is directed to a print head for an additive manufacturing system. The print head may include a nozzle tip, a first matrix source configured to selectively supply a structural matrix to the nozzle tip, and a second matrix source configured to selectively supply a temporary support matrix to the nozzle tip. The print head may also include a reinforcement supply configured to supply a continuous reinforcement through the nozzle tip only when the first matrix source is supplying the structural matrix to the nozzle tip.

In another aspect, the present disclosure is directed to a system for additively manufacturing a composite structure. The system may include a print head configured to discharge a continuous reinforcement at least partially coated with a matrix. The print head may include a nozzle tip, a first matrix source configured to selectively supply a structural matrix to the nozzle tip, and a second matrix source configured to selectively supply a temporary support matrix to the nozzle tip. The print head may also include a reinforcement supply configured to supply the continuous reinforcement through the nozzle tip only when the first matrix source is supplying the structural matrix to the nozzle tip, and a cure enhancer configured to initiate curing of at least one of the structural matrix and the temporary support matrix. The system may further include a frame configured to move the head during discharging, and a controller configured to selectively fluidly connect the first and second matrix supplies with the nozzle tip, to energize the cure enhancer, and to cause the frame to move the head based on specifications for the composite structure.

In yet another aspect, the present disclosure is directed to a method of additively manufacturing a composite structure. The method may include receiving specifications for the composite structure, and alternatingly discharging one of a thermoset resin-wetted continuous reinforcement and a continuous reinforcement-free dissolvable support matrix through a common print head nozzle based on the specifications. The method may also include moving the print head nozzle during discharging to form a three-dimensional trajectory of the composite structure, and exposing at least the thermoset resin to a cure energy during discharging.

DETAILED DESCRIPTION

Figure 1:
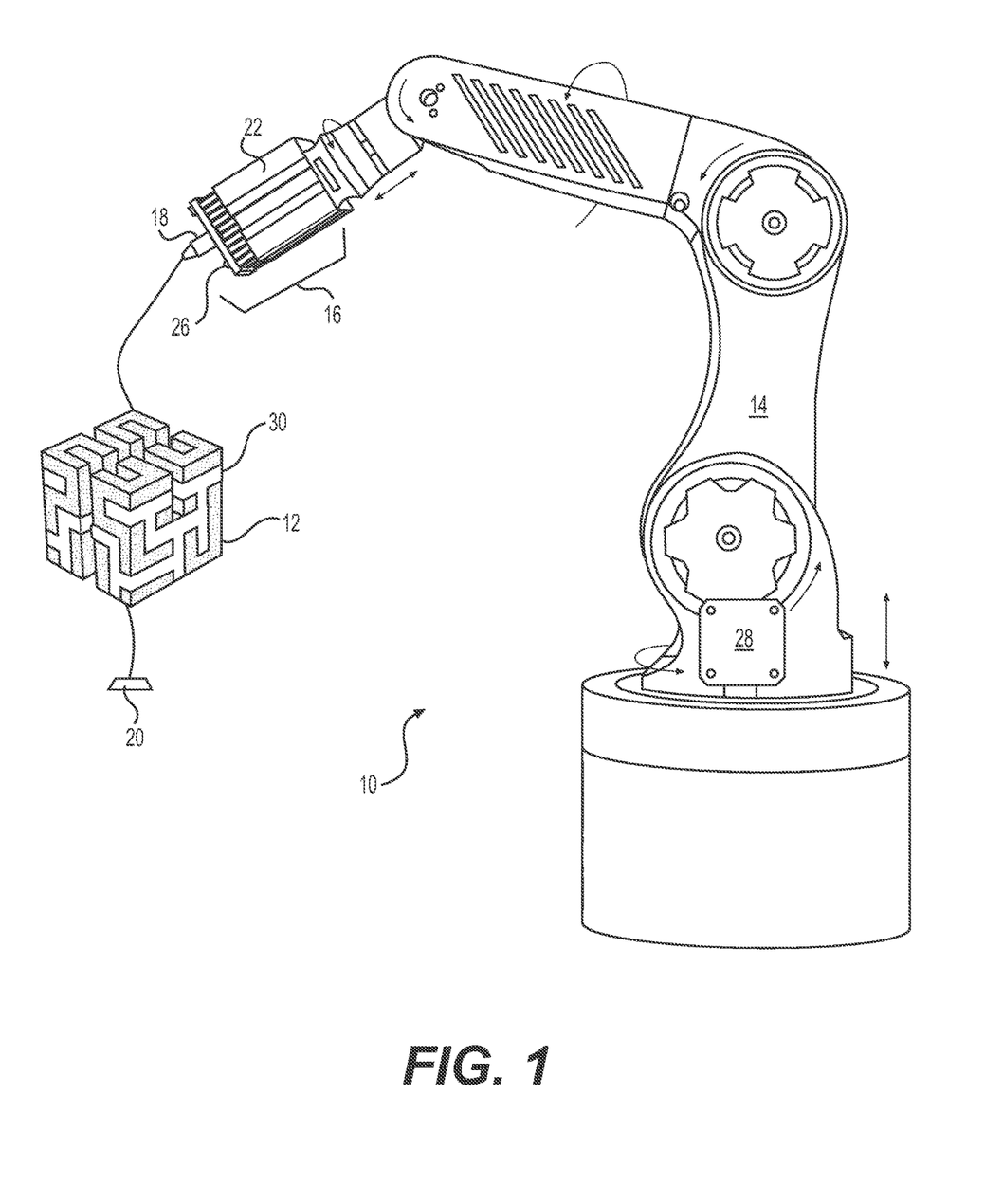
FIG. 1 is a diagrammatic illustration of an exemplary disclosed additive manufacturing system.

FIG. 1 illustrates an exemplary system 10, which may be used to continuously manufacture a composite structure 12 having any desired cross-sectional shape (e.g., ellipsoidal, polygonal, etc.). System 10 may include at least a moveable frame 14 and a print head ("head") 16. Head 16 may be coupled to and moved by frame 14. In the disclosed embodiment of FIG. 1, frame 14 is a robotic arm capable of moving head 16 in multiple directions during fabrication of structure 12, such that a resulting longitudinal axis of structure 12 is three-dimensional. It is contemplated, however, that frame 14 could alternatively be an overhead gantry or a hybrid gantry/arm also capable of moving head 16 in multiple directions during fabrication of structure 12. Although frame 14 is shown as being capable of multi-axis movements, it is contemplated that any other type of frame 14 capable of moving head 16 in the same or in a different manner could also be utilized, if desired. In some embodiments, a drive may mechanically couple head 16 to frame 14 and may include components that cooperate to move and/or supply power or materials to head 16.

Head 16 may be configured to receive or otherwise contain a matrix. The matrix may include any type of material (e.g., a liquid resin, such as a zero-volatile organic compound resin; a powdered metal; etc.) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, reversible resins (e.g., Triazolinedione, a covalent-adaptable network, a spatioselective reversible resin, etc.) and more. In one embodiment, the matrix inside head 16 may be pressurized, for example by an external device (e.g., an extruder or another type of pump—not shown) that is fluidly connected to head 16 via a corresponding conduit (not shown). In another embodiment, however, the matrix pressure may be generated completely inside of head 16 by a similar type of device. In yet other embodiments, the matrix may be gravity-fed through and/or mixed within head 16. In some instances, the matrix inside head 16 may need to be kept cool and/or dark to inhibit premature curing; while in other instances, the matrix may need to be kept warm for similar reasons. In either situation, head 16 may be specially configured (e.g., insulated, chilled, and/or warmed) to provide for these needs.

The matrix may be used to coat, encase, or otherwise at least partially surround (e.g., wet) any number of continuous reinforcements (e.g., separate fibers, tows, rovings, ribbons, and/or sheets of material) and, together with the reinforcements, make up at least a portion (e.g., a wall) of composite structure 12. The reinforcements may be stored within (e.g., on separate internal spools—not shown) or otherwise passed through head 16 (e.g., fed from one or more external spools 17—shown in FIGS. 2-4). When multiple reinforcements are simultaneously used, the reinforcements may be of the same type and have the same diameter and cross-sectional shape (e.g., circular, square, flat, hollow, solid, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix discharging from head 16.

The reinforcements may be exposed to (e.g., coated with) the matrix while the reinforcements are inside head 16, while the reinforcements are being passed to head 16 (e.g., as a prepreg material), and/or while the reinforcements are discharging from head 16, as desired. The matrix, dry reinforcements, and/or reinforcements that are already exposed to the matrix (e.g., wetted reinforcements) may be transported into head 16 in any manner apparent to one skilled in the art.

The matrix and reinforcement may be discharged from a nozzle 18 of head 16 via at least two different modes of operation. In a first mode of operation, the matrix and reinforcement are extruded (e.g., pushed under pressure and/or mechanical force) from nozzle 18, as head 16 is moved by frame 14 to create the 3-dimensional shape of structure 12. In a second mode of operation, at least the reinforcement is pulled from nozzle 18, such that a tensile stress is created in the reinforcement during discharge. In this mode of operation, the matrix may cling to the reinforcement and thereby also be pulled from nozzle 18 along with the reinforcement, and/or the matrix may be discharged from nozzle 18 under pressure along with the pulled reinforcement. In the second mode of operation, where the matrix is being pulled from nozzle 18, the resulting tension in the reinforcement may increase a strength of structure 12, while also allowing for a greater length of unsupported material to have a straighter trajectory (i.e., the tension may act against the force of gravity to provide free-standing support for structure 12).

The reinforcement may be pulled from nozzle 18 as a result of head 16 moving away from an anchor point 20. In particular, at the start of structure-formation, a length of matrix-impregnated reinforcement may be pulled and/or pushed from nozzle 18, deposited onto a stationary anchor point 20, and cured, such that the discharged material adheres to anchor point 20. Thereafter, head 16 may be moved away from anchor point 20, and the relative movement may cause additional reinforcement to be pulled from nozzle 18. It should be noted that the movement of the reinforcement through head 16 could be assisted (e.g., via internal feed mechanisms), if desired. However, the discharge rate of the reinforcement from nozzle 18 may primarily be the result of relative movement between head 16 and anchor point 20, such that tension is created within the reinforcement.

Nozzle 18 may be fluidly connected to a matrix reservoir 22. Although matrix reservoir 22 is shown as being at least partially inside of head 16, it should be noted that matrix reservoir 22 could alternatively be located separately upstream of head 16. Nozzle 18 may be a generally cylindrical component having an upstream or base end in communication with matrix reservoir 22, a downstream or tip end, and one or more passages that extend from the base end to the tip end.

Any number of reinforcements (represented as R in FIGS. 2-4) may be passed axially through reservoir 22 where at least some matrix-wetting occurs (matrix represented as M in FIGS. 2-4), and discharged from head 16 via nozzle 18. One or more orifices may be located at the tip end of nozzle 18 to accommodate passage of the matrix-wetted reinforcements. In the disclosed embodiment, a single generally circular orifice is utilized. It is contemplated, however, that multiple circular orifices could be used. In addition, orifices of another shape (e.g., a rectangular shape) may allow for printing of ribbons and/or sheets.

One or more cure enhancers (e.g., one or more light sources, ultrasonic emitters, lasers, heaters, catalyst dispensers, microwave generators, etc.) 26 may be mounted proximate head 16 (e.g., at a trailing side of nozzle 18) and configured to enhance a cure rate and/or quality of the matrix as it is discharged from nozzle 18. Cure enhancer 26 may be controlled to selectively expose internal and/or external surfaces of structure 12 to cure energy (e.g., light energy, electromagnetic radiation, vibrations, heat, a chemical catalyst or hardener, etc.) during the formation of structure 12. The cure energy may increase a rate of chemical reaction occurring within the matrix, sinter the material, harden the material, or otherwise cause the material to cure as it discharges from nozzle 18.

A controller 28 may be provided and communicatively coupled with frame 14, head 16, and any number and type of cure enhancers 26. Controller 28 may embody a single processor or multiple processors that include a means for controlling an operation of system 10. Controller 28 may include one or more general- or special-purpose processors or microprocessors. Controller 28 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 28, including power supply circuitry, signal-conditioning circuitry, solenoid/motor driver circuitry, communication circuitry, and other appropriate circuitry. Moreover, controller 28 may be capable of communicating with other components of system 10 via wired and/or wireless transmission.

One or more maps may be stored in the memory of controller 28 and used during fabrication of structure 12. Each of these maps may include a collection of data in the form of models, lookup tables, graphs, and/or equations. In the disclosed embodiment, the maps are used by controller 28 to determine desired characteristics of cure enhancers 26, the associated matrix, and/or the associated reinforcements at different locations within structure 12. The characteristics may include, among others, a type, quantity, and/or configuration of reinforcement and/or matrix to be discharged at a particular location within structure 12, and/or an amount, intensity, shape, and/or location of desired curing. Controller 28 may then correlate operation of frame 14 (e.g., the location and/or orientation of head 16) and/or the discharge of material from head 16 (a type of material, desired performance of the material, cross-linking requirements of the material, a discharge rate, etc.) with the operation of cure enhancers 26, such that structure 12 is produced in a desired manner.

During fabrication of some composite structures 12 (e.g., heavy structures and/or structures requiring high-force compaction), it may be beneficial to provide a temporary support 30 in some overhanging areas. Temporary support 30 may be fabricated from a matrix only or from a matrix and a filler (e.g., chopped fibers). In general, temporary support 30 may not include continuous reinforcements. In addition, the matrix of temporary support 30 may be different from the matrix coating the continuous reinforcements of composite structure 12. For example, the support matrix may be removable when exposed to a particular condition (e.g., to a particular solvent such as water, air, heat, or sunlight).

Figure 2:
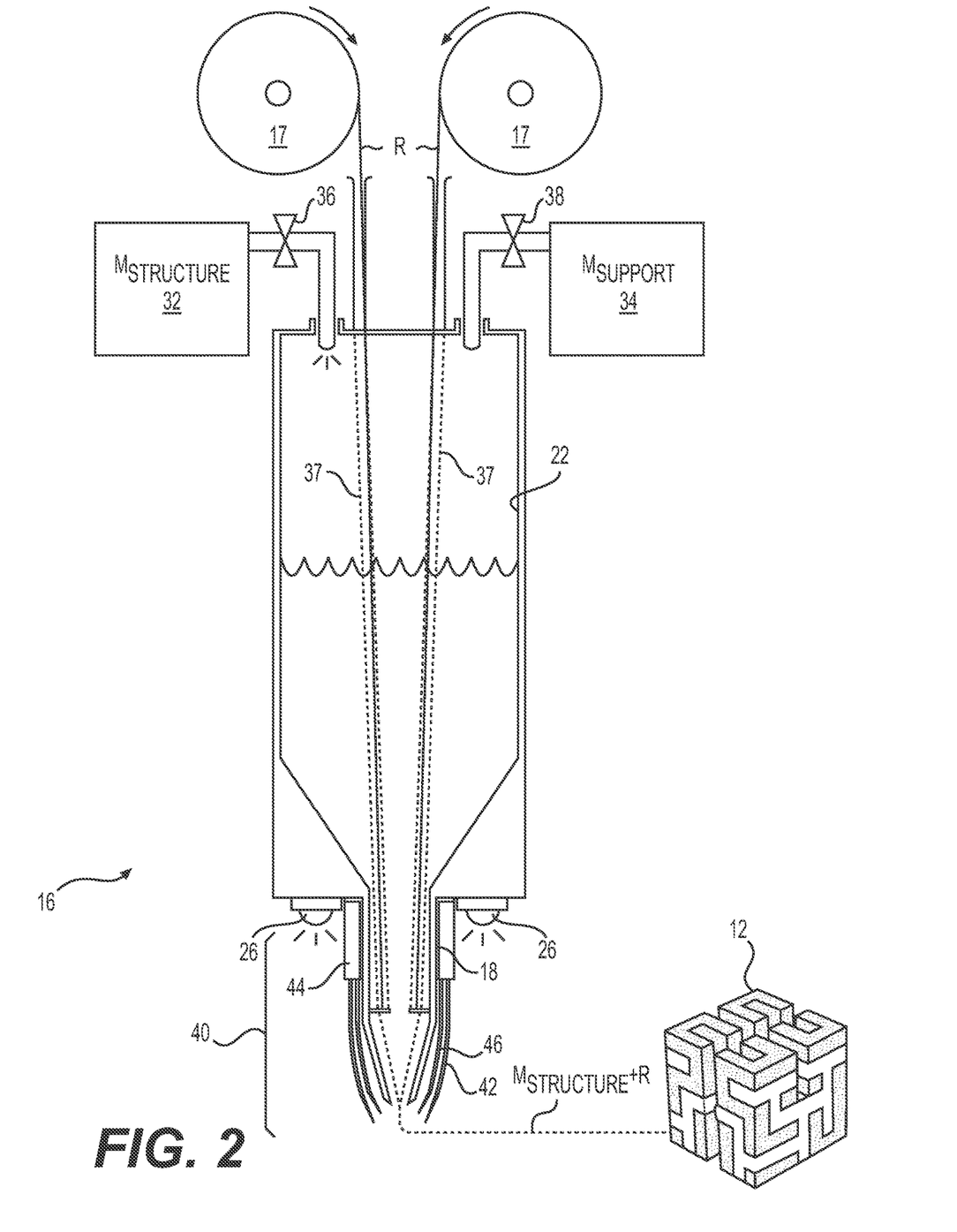
FIGS. 2, 3, and 4 are cross-sectional illustrations of an exemplary print head that may be utilized with the manufacturing system of FIG. 1.

FIG. 2 illustrates an exemplary head 16 that may be used to discharge both the matrix-wetted continuous reinforcements of composite structure 12 and the removable matrix of temporary support 30 disclosed above. For this purpose, head 16 of FIG. 2 may include at least two different matrix sources located upstream of nozzle 18 (e.g., in fluid communication with matrix reservoir 22). Each matrix source may be configured to deliver a different matrix to nozzle 18. For example, a structural matrix source 32 may delivery a structural-type of matrix ($M_{structure}$) that is intended to firmly bond with the continuous reinforcements from spool (s) 17 and form a permanent part of structure 12. In this same example, a support matrix source 34 may deliver a support-type of matrix ($M_{support}$) that is intended to loosely and temporarily bond with the other materials that permanently make up structure 12.

During operation of system 10, when permanent features of structure 12 are to be fabricated, structural matrix source 32 may be selectively activated by controller 28 (e.g., via energizing of an associated valve 36 and/or pump—not shown) to discharge composite material through nozzle 18. It is contemplated that the reinforcements from spool(s) 17 may pass through a spray of the structural matrix from source 32 and/or through a bath inside matrix reservoir 22 as it is provided with the structural matrix by source 32. In one embodiment, a porous or otherwise perforated guide 37 may help to guide the reinforcements through matrix reservoir 22 and/or nozzle 18, while at the same time allowing the structural matrix to saturate the continuous reinforcements. Cure enhancers 26 may be active during the discharge of composite material to initiate curing. Support matrix source 34 may be fluidly isolated from matrix reservoir 22, nozzle 18, and the continuous reinforcements at this time.

During operation of system 10, when temporary supports 30 are to be fabricated, support matrix source 34 may be selectively activated by controller 28 (e.g., via energizing of an associated valve 38 and/or pump—not shown) to discharge only the support matrix (or the support matrix and the filler) into matrix reservoir 22 and through nozzle 18. Cure enhancers 26 may be active or inactive during the discharge of the support matrix, depending on cure requirements of the support matrix. Structural matrix source 32 may be fluidly isolated from matrix reservoir 22 and/or nozzle 18 at this time.

It is contemplated that, in some instances, matrix reservoir 22, nozzle 18, and or the reinforcements inside of head 16 may need to be purged of one matrix prior to introduction of another matrix. For example, when switching from support fabrication to feature fabrication, the support matrix may need to be purged from inside of head 16 so that the structural matrix is not contaminated or otherwise compromised in structural properties. The opposite, however, may not be true. Specifically, in some embodiments, there may be no need to purge head 16 of the structural matrix prior to introduction of the support matrix, as a degradation in support properties may either not occur (e.g., because the structural support material may actually enhance temporary support 30) or such a degradation in properties may be unimportant. Many different methods for purging head 16 may be utilized including, for example, directing pressurized air through head 16, directing another solvent through head 16, connecting a vacuum to head 16, etc.

In some applications, it may be necessary to sever the continuous reinforcements discharging from head 16 at conclusion of feature fabrication and prior to initiating support fabrication. Otherwise, further movement of head 16 could cause the continuous reinforcements to be pulled out during support fabrication and/or to extend from structure 12 into temporary support 30. This could make removal of temporary support 30 more difficult. For this reason, a cutting mechanism 40 may be provided.

Cutting mechanism 40 may be an integral part of head 16. For example, cutting mechanism 40 could be mounted to head 16 at a lower end of matrix reservoir 22 and/or at a tip of nozzle 18. In the disclosed embodiment, cutting mechanism 40 includes a pair of opposing arms 42 that are either pivoted or deformed radially inward during operation of an associated actuator 44 (e.g., during axial motion of actuator 44). Actuator 44 may be, for example, a mechanical device (e.g., a lead screw), a hydraulic or pneumatic device (e.g., a piston), a hybrid device, or another type of device known in the art.

In one embodiment, an additional set of arms 46 may be located radially inward from arms 42. Arms 46 may be moved by actuator 44 or by another actuator (not shown), to radially pinch down on and hold the continuous reinforcements in preparation for cutting by arms 42. In this configuration, tips of arms 46 may be blunted, while tips of arms 42 may be sharpened.

Figure 3:
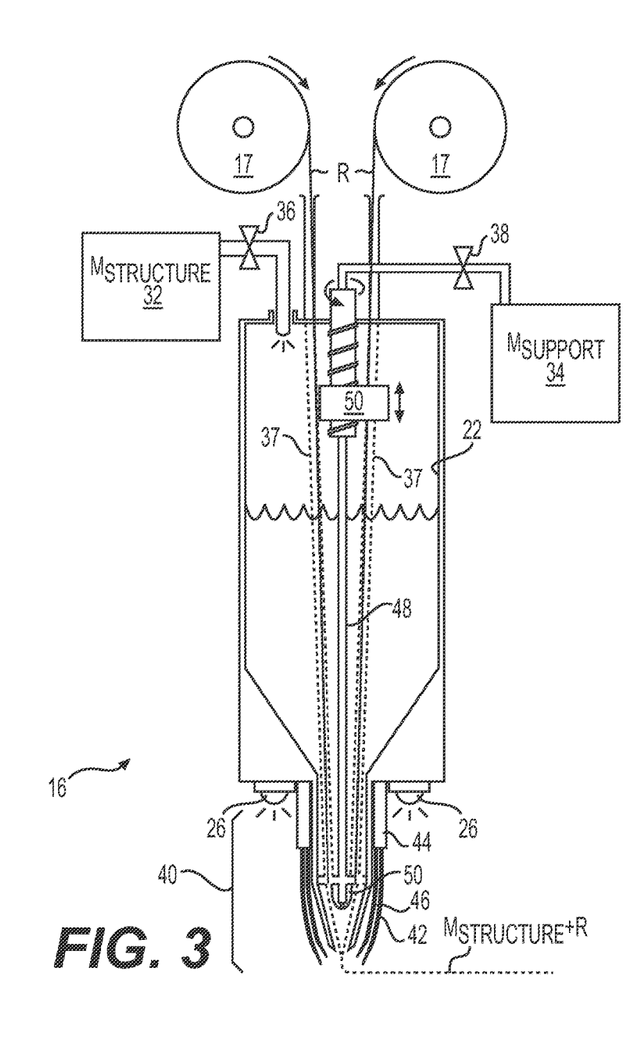
Figure 4:
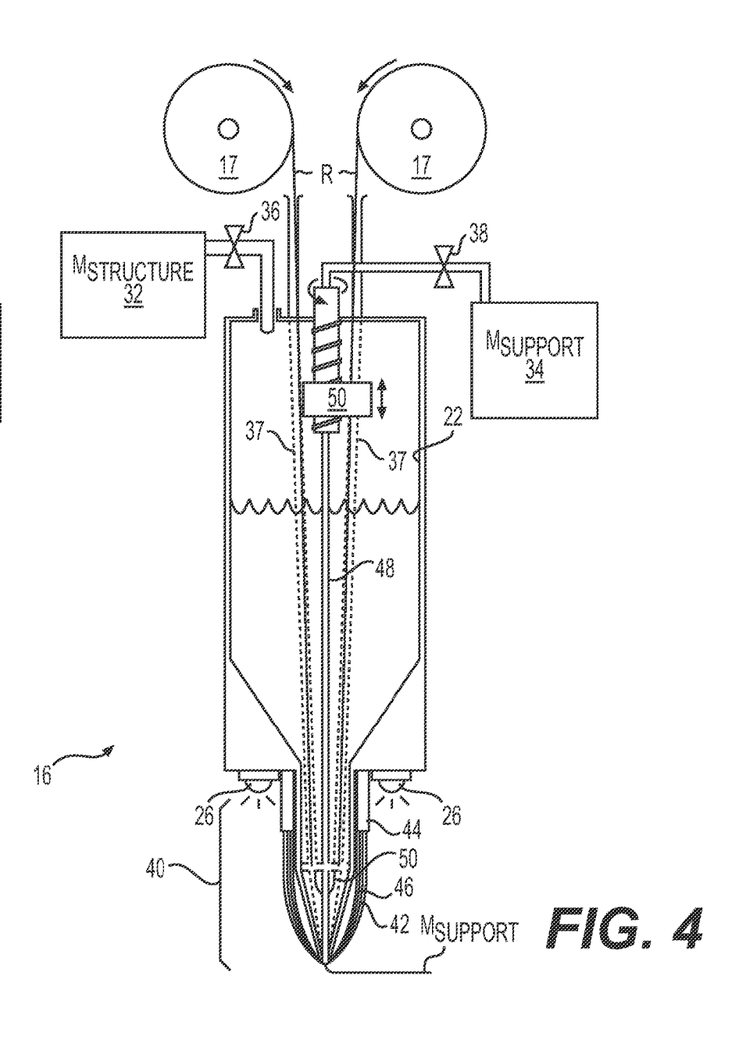

FIGS. 3 and 4 illustrate an embodiment of head 16 that reduces (or eliminates) the need to purge head 16 between support fabrication and structure fabrication. Like head 16 of FIG. 2, head 16 of FIGS. 3 and 4 may include nozzle 18 fluidly connected to matrix reservoir 22, cure enhancers 26, and structural and support matrix sources 32 and 34 (along with valves 36 and 38). However, in contrast to head 16 of FIG. 2, head 16 of FIGS. 3 and 4 also includes a supply tube 48 that extends from support matrix source 34 into nozzle 18. This may allow the support matrix to pass through matrix reservoir 22, without mixing with or contaminating the structural matrix therein.

In one embodiment, supply tube 48 is movable. For example, supply tube 48 may be moveable in an axial direction of head 16, from a stowed position (shown in FIG. 3) to an extended position (Shown in FIG. 4). Supply tube 48 may be in the stowed position during discharge of composite material (i.e., during discharge of continuous reinforcements wetted with the structural matrix), and in the extended position during discharge of support material. When in the extended position, an open end of supply tube 48 may be placed near or extend through the orifice of nozzle 18, such that no mixing of matrixes occurs inside head 16. A check-type flap or other unidirectional valve 50 may be located at the open end of supply tube 48 and configured to seal off supply tube 48 when supply tube 48 is in the stowed position. An actuator 52 (e.g., a leadscrew type actuator, a solenoid actuator, or another type of linear actuator) may be connected between supply tube 48 and a housing of matrix reservoir 22 to generate the motion of supply tube 48 between the stowed and extended positions.

INDUSTRIAL APPLICABILITY

The disclosed system and print head may be used to continuously manufacture composite structures having any desired cross-sectional size, shape, length, density, and/or strength. The composite structures may be fabricated from any number of different reinforcements of the same or different types, diameters, shapes, configurations, and consists, each coated with a variety of matrixes. In addition, the disclosed system may allow for on-the-fly fabrication of temporary supports. Operation of system 10 will now be described in detail.

At a start of a manufacturing event, information regarding a desired structure 12 may be loaded into system 10 (e.g., into controller 28 that is responsible for regulating operations of frame 14 and/or head 16). This information may include, among other things, a size (e.g., diameter, wall thickness, length, etc.), a contour (e.g., a trajectory), surface features (e.g., ridge size, location, thickness, length; flange size, location, thickness, length; etc.) and finishes, connection geometry (e.g., locations and sizes of couplings, tees, splices, etc.), location-specific matrix stipulations, location-specific reinforcement stipulations, primary load paths, support requirements, etc. It should be noted that this information may alternatively or additionally be loaded into system 10 at different times and/or continuously during the manufacturing event, if desired. Based on the component information, one or more different reinforcements and/or matrixes may be selectively installed and/or continuously supplied into system 10.

Installation of the reinforcements may be performed by passing the reinforcements from spool(s) 17 down through matrix reservoir 22 (e.g., via guide(s) 38), and then threading the reinforcements through nozzle 18. Installation of the structural matrix may include filling reservoir 22 within head 16 and/or coupling of one matrix sources (e.g., structural matrix source 32 and support matrix source 34) to head 16. Head 16 may then be moved by frame 14 under the regulation of controller 28 to cause matrix-coated reinforcements (i.e., continuous reinforcements that are coated in the structural matrix) to be placed against or on a corresponding stationary anchor point 20. Cure enhancers 26 within head 16 may then be selectively activated to cause hardening of the structural matrix surrounding the continuous reinforcements, thereby bonding ends of the continuous reinforcements to anchor point 20.

The component information may then be used to control operation of system 10. For example, the continuous reinforcements may be pulled and/or pushed from nozzle 18 (along with the structural matrix), while frame 14 selectively moves head 16 in a desired manner during curing, such that an axis of the resulting structure 12 follows a desired trajectory (e.g., a free-space, unsupported, 3-D trajectory).

Once structure 12 has grown to a desired size and/or length, structure 12 may be disconnected (e.g., severed) from head 16 in any desired manner.

At any time during the manufacturing process, it may be beneficial to produce temporary supports 30. Temporary supports 30 may be used as anchor points 20 at the beginning of the manufacturing process and/or as base or intermediate layers upon which the composite material may be deposited and/or compacted. As described above, the same head 16 and the same nozzle 18 may be used to discharge both the structural matrix-saturated reinforcement and the reinforcement-free support matrix.

For example, to switch between fabrication using the structural matrix-wetted continuous reinforcement and fabrication using only the support matrix, actuator 44 may be selectively energized by controller 28 to cause outer arms 42 to close on and cut the continuous reinforcement. In some embodiments, the continuous reinforcement may first be clamped by inner arms 46.

In regard to the embodiment of FIG. 2, valve 36 may then be closed to halt the introduction of the structural matrix into reservoir 22. At about this same time, valve 38 may be opened to start the introduction of the support matrix into reservoir 22. Some mixing of matrixes may occur at this time. However, since the support matrix may ultimately be removed from structure 12, this mixing may be acceptable in some situations. In other situations, reservoir 22 may first be purged (e.g., by introducing a purge fluid into and/or by connecting a vacuum to reservoir 22) of the structural matrix before opening valve 38. Fabrication of temporary support 30 may then commence, for example by extruding pressurized support matrix through nozzle 18 during movement of head 16. To switch back to fabrication of matrix-wetted continuous reinforcements, valve 38 may be closed, reservoir 22 may be purged, and valve 36 thereafter opened. The above-described anchoring process may then be re-initiated, if desired.

In regard to the embodiment of FIGS. 3 and 4, there may be no need to purge reservoir 22 during switching between matrixes. Instead, when switching from discharging of structural matrix-wetted reinforcement to only support matrix and after completing the cutting process described above, actuator 50 may be selectively energized to push tube 48 through check valve 50 and into the open orifice of nozzle 18. Valve 36 may then be closed and valve 38 opened, thereby halting the discharge of structural matrix and initiating the discharge of support matrix. The process may be simply reversed to switch back to discharging of structural matrix-wetted continuous reinforcements.

It will be apparent to those skilled in the art that various modifications and variations can be made to the disclosed system, method, and print head. Other embodiments will be apparent to those skilled in the art from consideration of the specification and practice of the disclosed system, method, and print head. It is intended that the specification and examples be considered as exemplary only, with a true scope being indicated by the following claims and their equivalents.

What is claimed is:

1. A print head, comprising:
   a nozzle tip;
   a first matrix source configured to selectively supply a structural matrix to the nozzle tip;
   a second matrix source configured to selectively supply a temporary support matrix to the nozzle tip;
   a reinforcement supply configured to supply a continuous reinforcement through the nozzle tip;

a matrix reservoir in fluid communication with the nozzle tip; and a tube that extends from the second matrix source through the matrix reservoir to the nozzle tip, wherein the first matrix source is configured to direct the structural matrix into the matrix reservoir.

2. The head of claim 1, wherein the temporary support matrix is dissolvable via the application of at least one of water, air, heat, and light.

3. The head of claim 1, wherein the structural matrix is a thermoset resin.

4. The head of claim 1, wherein the second matrix source is also configured to direct the temporary support matrix into the matrix reservoir.

5. The head of claim 1, further including a unidirectional valve located at a tip end of the tube.

6. The head of claim 5, further including an actuator configured to selectively move the tube to open the unidirectional valve.

7. The head of claim 1, further including a cure enhancer mounted adjacent the nozzle tip and configured to initiate curing of at least one of the structural matrix and the temporary support matrix.

8. A print head, comprising:
a nozzle tip;
a first matrix source configured to selectively supply a structural matrix to the nozzle tip;
a second matrix source configured to selectively supply a temporary support matrix to the nozzle tip;
a reinforcement supply configured to supply a continuous reinforcement through the nozzle tip; and
a perforated fiber guide passing through the matrix reservoir.

9. A print head, comprising:
a nozzle tip;
a first matrix source configured to selectively supply a structural matrix to the nozzle tip;
a second matrix source configured to selectively supply a temporary support matrix to the nozzle tip;
a reinforcement supply configured to supply a continuous reinforcement through the nozzle tip; and
a cutting mechanism configured to sever the continuous reinforcement during switching between discharging of the structural matrix and discharging of the temporary support matrix, wherein the cutting mechanism includes an inner set of arms configured to grasp the continuous reinforcement and an outer set of arms configured to cut through the continuous reinforcement.

10. A system for additively manufacturing a composite structure, comprising:
a head configured to discharge a continuous reinforcement at least partially coated with a matrix, the head including:
a nozzle tip;
a first matrix source configured to selectively supply a structural matrix to the nozzle tip;
a second matrix source configured to selectively supply a temporary support matrix to the nozzle tip;
a reinforcement supply configured to supply the continuous reinforcement through the nozzle tip when activated; and
a cure enhancer configured to expose at least one of the structural matrix and the temporary support matrix to a cure energy;
a frame configured to move the head during discharging; and
a controller configured to:
selectively fluidly connect the first and second matrix supplies with the nozzle tip;
energize the cure enhancer; and
cause the frame to move the head based on specifications for the composite structure; and
activate the reinforcement supply when only the first matrix source is supplying the structural matrix to the nozzle tip.

11. The system of claim 10, wherein:
the temporary support matrix is dissolvable via the application of at least one of water, air, heat, and light; and
the structural matrix is a thermoset resin.

12. The system of claim 10, wherein:
the head includes a matrix reservoir in fluid communication with the nozzle tip; and
the first matrix source is configured to direct the structural matrix into the matrix reservoir.

13. The system of claim 12, wherein the second matrix source is also configured to direct the temporary support matrix into the matrix reservoir.

14. The system of claim 12, further including:
a tube that extends from the second matrix source through the matrix reservoir to the nozzle tip; and
a unidirectional valve located at a tip end of the tube.

15. The system of claim 14, further including an actuator configured to selectively move the tube to open the unidirectional valve.

16. The system of claim 10, further including a perforated fiber guide passing through the matrix reservoir.

17. A method for additively manufacturing a composite structure, comprising:
receiving specifications for the composite structure;
alternatingly discharging one of a resin-wetted continuous reinforcement and a continuous reinforcement-free support matrix through a common print head nozzle based on the specifications;
moving the print head nozzle during discharging to form a three-dimensional trajectory of the composite structure; and
exposing at least the resin-wetted continuous reinforcement to a cure energy during discharging to harden the resin-wetted continuous reinforcement.

* * * * *